(12) United States Patent
Mayville et al.

(10) Patent No.: US 7,802,812 B2
(45) Date of Patent: Sep. 28, 2010

(54) GAS GENERATING SYSTEM

(75) Inventors: Brian A. Mayville, Troy, MI (US); Christopher T. Sledz, Armada, MI (US)

(73) Assignee: TK Holdings, Inc., Armada, MI (US)

( * ) Notice: Subject to any disclaimer, the term of this patent is extended or adjusted under 35 U.S.C. 154(b) by 588 days.

(21) Appl. No.: 11/600,622

(22) Filed: Nov. 16, 2006

(65) Prior Publication Data

US 2007/0108751 A1    May 17, 2007

Related U.S. Application Data

(63) Continuation of application No. 11/445,859, filed on Jun. 1, 2006.

(60) Provisional application No. 60/737,564, filed on Nov. 16, 2005.

(51) Int. Cl.
*B60R 21/26* (2006.01)

(52) U.S. Cl. ............ 280/741; 280/736

(58) Field of Classification Search .......... 280/741, 280/736
See application file for complete search history.

(56) References Cited

U.S. PATENT DOCUMENTS

| | | | | |
|---|---|---|---|---|
| 5,673,933 A | * | 10/1997 | Miller et al. | 280/736 |
| 5,806,888 A | * | 9/1998 | Adamini | 280/741 |
| 5,872,329 A | * | 2/1999 | Burns et al. | 149/36 |
| 6,095,559 A | * | 8/2000 | Smith et al. | 280/741 |
| 6,149,193 A | * | 11/2000 | Canterberry et al. | 280/741 |
| 6,213,503 B1 | * | 4/2001 | Zimbrich et al. | 280/736 |
| 6,314,889 B1 | * | 11/2001 | Smith | 102/530 |
| 6,607,213 B2 | * | 8/2003 | Yamamori et al. | 280/736 |
| 6,889,613 B2 | * | 5/2005 | Parizat et al. | 102/530 |
| 7,185,588 B2 | * | 3/2007 | Clark et al. | 102/530 |
| 2006/0273564 A1 | * | 12/2006 | McCormick et al. | 280/740 |

* cited by examiner

*Primary Examiner*—Faye M. Fleming
*Assistant Examiner*—Drew Brown
(74) *Attorney, Agent, or Firm*—L.C. Begin & Associates, PLLC.

(57) ABSTRACT

A gas generating system (10) includes a housing (12), a first end closure (22) secured to the housing (12) for hermetically sealing a first end portion of the housing, and a first bore seal (26) formed separately from the first end closure (22) and secured to the first end closure (22) for mounting a first gas generant combustion initiation mechanism (24) therein. The gas generator (10) may include single-stage and/or dual-stage capability.

22 Claims, 3 Drawing Sheets

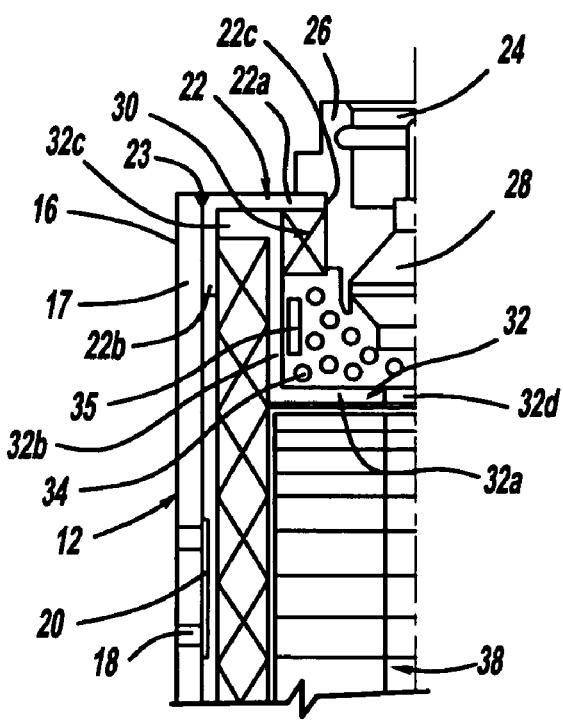
FIG-1
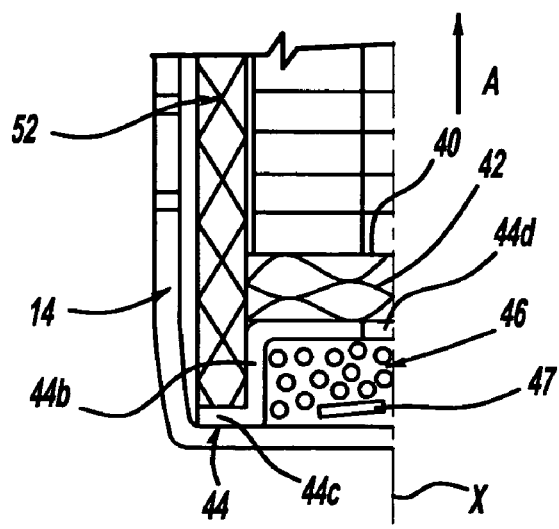
FIG-2
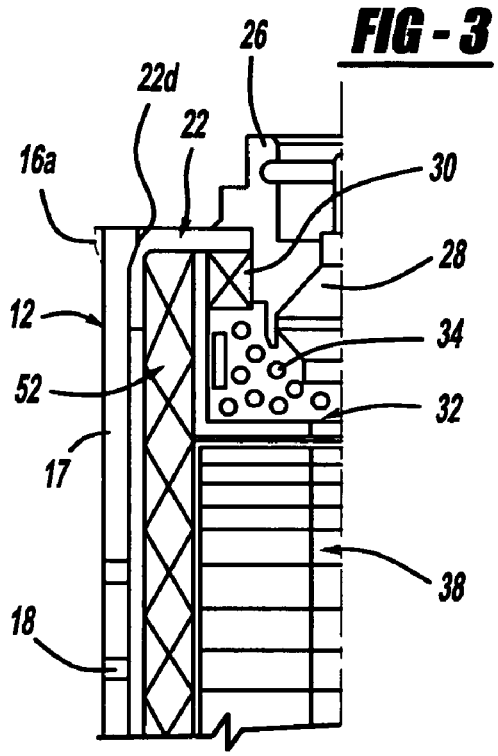
FIG-3
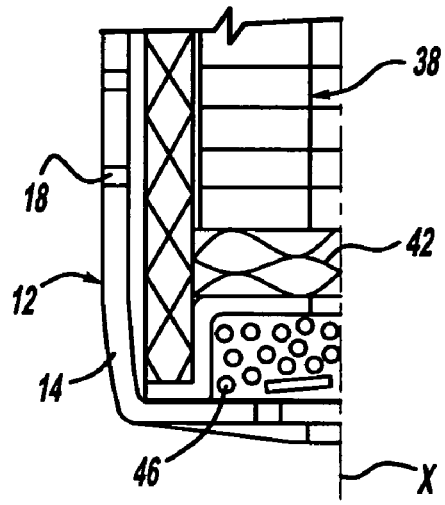

GAS GENERATING SYSTEM

CROSS REFERENCE TO RELATED APPLICATIONS

This application claims the benefit of provisional application Ser. No. 60/737,564 filed on Nov. 16, 2005. This application is a continuation of and claims the benefit of U.S. application Ser. No. 11/445,859 having a filing date of Jun. 1, 2006.

BACKGROUND OF THE INVENTION

The present invention relates generally to gas generating systems and, more particularly, to gas generating systems for use in applications such as inflatable occupant restraint systems in motor vehicles.

Installation of inflatable occupant protection systems as standard equipment in all new vehicles has intensified the search for smaller, lighter and less expensive protection systems. Accordingly, since the inflation gas generator used in such protection systems tends to be the heaviest and most expensive component, there is a need for a lighter, more compact, and less expensive gas generating system.

A typical gas generating system includes cylindrical steel or aluminum housing having a diameter and length related to the vehicle application and characteristics of a gas generant composition contained therein. Because inhalation by a vehicle occupant of particulates generated by gas generant combustion during airbag activation can be hazardous, it is desirable to remove particulate material, or slag, produced during combustion of the gas generant. Thus, the gas generating system is generally provided with an internal or external filter comprising one or more layers of steel screen of varying mesh and wire diameter. Gas produced upon combustion of the gas generant passes through the filter before exiting the gas generating system. In a conventional system, the particulates are substantially removed as the gas passes through the filter. In addition, heat from combustion gases is transferred to the material of the filter as the gases flow through the filter. Thus, as well as filtering particulates from the gases, the filter acts to cool the combustion gases prior to dispersal into an associated gas-actuatable device. However, it is important to provide a gas generating system including these features while minimizing the size of the system, thereby reducing the overall packaging size of the vehicle safety system and providing greater design flexibility in various applications or uses of the gas generating system. Furthermore, reducing the size of the gas generating system reduces the raw material requirements, and may also advantageously reduce the manufacturing complexity, thereby reducing overall manufacturing costs.

Other ongoing concerns with gas generating systems include the ability to achieve any one of a variety of ballistic profiles by varying as few of the physical parameters of the gas generating system as possible and/or by varying these physical parameters as economically as possible.

SUMMARY OF THE INVENTION

The above-referenced concerns may be mitigated or obviated by providing a gas generating system according to one of the embodiments described herein, including a housing, a first end closure secured to the housing for hermetically sealing a first end portion of the housing, and a first bore seal formed separately from the first end closure and secured to the first end closure for mounting a first gas generant combustion initiation mechanism therein.

BRIEF DESCRIPTION OF THE DRAWINGS

In the drawings illustrating embodiments of the present invention:

FIG. 1 is a cross-sectional side view of a first embodiment of a gas generating system in accordance with the present invention;

FIG. 2 is a cross-sectional side view of a second embodiment of a gas generating system in accordance with the present invention;

FIG. 3 is a cross-sectional side view of a third embodiment of a gas generating system in accordance with the present invention;

DETAILED DESCRIPTION

Figure 4:
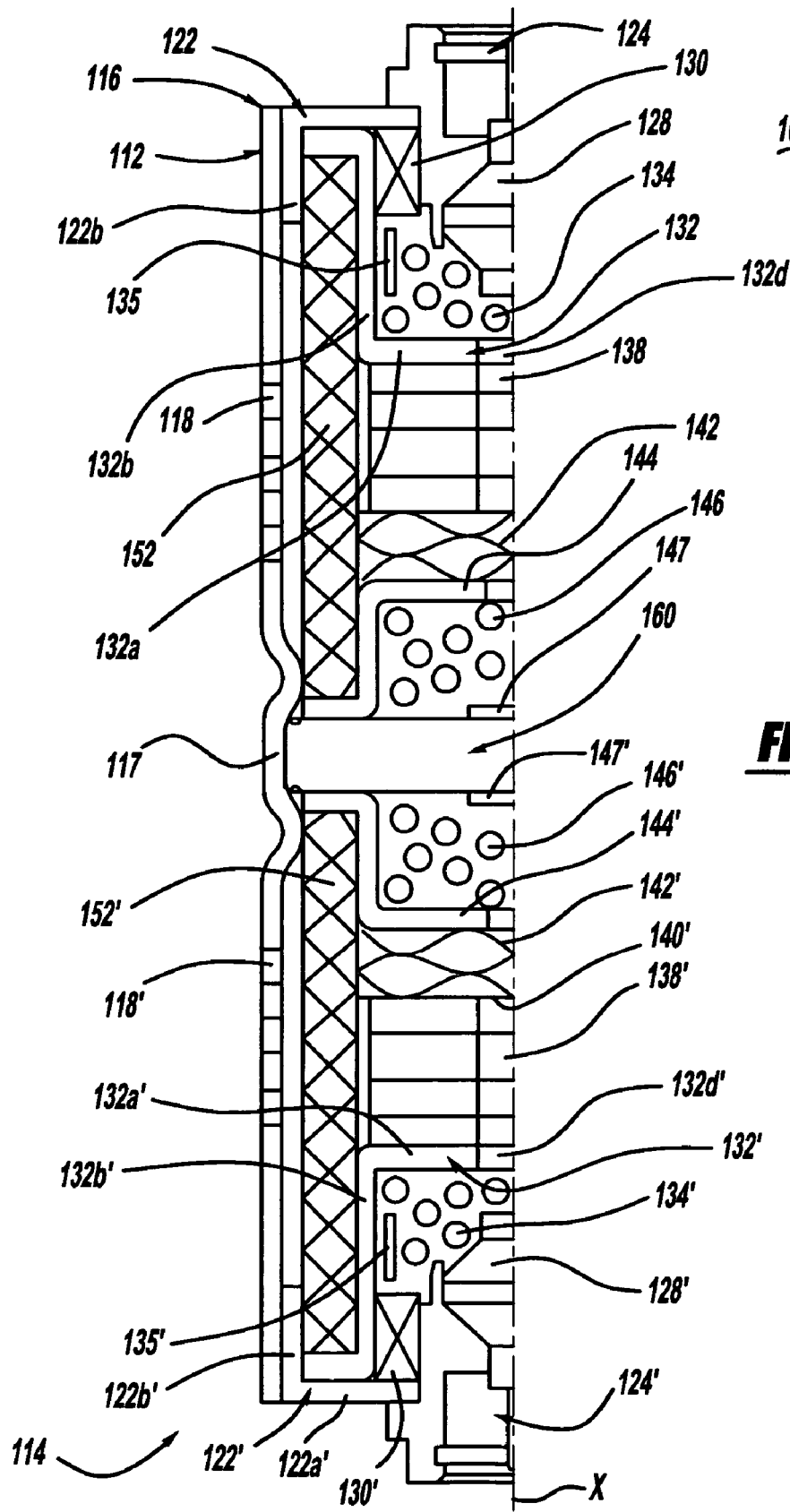
FIG. 4 is a cross-sectional side view of a fourth embodiment of a gas generating system in accordance with the present invention.

FIG. 1 shows one embodiment 10 of a single-stage gas generating system in accordance with the present invention. One of ordinary skill in the art will appreciate various methods of construction for the various components of the gas generating system. Referring to FIG. 1, gas generating system 10 includes a substantially cylindrical housing 12 having a first end 16, a second end 14 opposite the first end, and a wall 17 extending between the ends to define a housing interior cavity. Housing 12 is made from a metal or metal alloy and may be rolled, stamped, deep-drawn, extruded, or otherwise metal-formed. Wall 17 contains one or more gas exit orifices 18 for enabling fluid communication between the interior of the housing and an associated inflatable device (for example, a safety belt pretensioner or other fluid-actuatable device incorporated into a vehicle occupant protection system.) Gas exit orifice(s) 18 are may be formed in housing wall 17 by drilling, punching, or other suitable means. In addition, the length of housing 12 may be varied according to design or customer requirements.

In one embodiment, the gas generating system is a micro gas generator fittable longitudinally within a cylindrical size envelope having a diameter of approximately 41.3 mm and is usable in, for example, a side seat inflator or a safety belt pretensioner. In a particular embodiment, the gas generating system has an overall system diameter of approximately 41.3 mm. In yet another particular embodiment, housing 12 has a finished outer diameter of approximately 41.3 mm. In another particular embodiment, a gas generating system in accordance with the present invention has an overall length of about 160 mm. In yet another particular embodiment, a gas generating system in accordance with the present invention has an overall length of about 220 mm. In yet another particular embodiment, a gas generating system in accordance with the present invention has a ratio of overall system length to overall system diameter is within a range from about 3.8/1 to about 5.3/1. However, the characteristics of the embodiments described herein may be incorporated into gas generating systems of many alternative sizes, usable for a variety of different applications.

In the embodiment shown in FIG. 1, a rupturable, fluid-tight seal 20 may be positioned over each of gas exit orifices 18 to prevent entry of water vapor or other contaminants into housing 12 prior to activation of the gas generating system. The seal is secured to the inner surface of housing wall 17 and forms a fluid-tight barrier between the interior of the housing and the exterior of the housing. Various known disks, foils, films, tapes, or other suitable materials may be used to form the seal.

In the embodiment shown in FIG. 1, housing 12 is formed from a deep-drawn shell of steel, aluminum, or another suitable metal or metal alloy. In another embodiment, shown in FIG. 2, housing 12 is formed from a metal tube which is hot-formed to close second end 14 of the housing. That is, the housing is heated to soften the metal, and then subjected to pressure to fold over or otherwise force edge portions of the housing second end 14 generally toward a central axis X of the housing, thereby closing and sealing end 14. Each of the methods described above for fabricating the housing (i.e., the hot-forming of housing second end 14 and the use of a deep-drawn cylinder) obviates the need for an end closure and seal at housing second end 14, thereby simplifying gas generator assembly, reducing the number of parts needed for assembly, and removing a potential leakage path for generated gases.

Referring again to FIG. 1, a housing end closure 22 includes a base portion 22a and an annular wall 22b extending from a circumference of the base portion to define a cavity for receiving therein other portions of the gas generating system, as described below. An outer diameter of end closure wall 22b is dimensioned so as to provide a sliding fit or interference fit between the wall and an inner diameter of housing wall 17 when end closure 22 is inserted into first end 16 of housing 12, as shown in FIG. 1. End closure base portion 22a also includes an opening 22c for mounting and securing therein a gas generant combustion initiation mechanism, for example, an igniter assembly 24 (described in greater detail below). End closure 22 may be formed from a metallic material such as carbon steel or stainless steel using any of a variety of known metal-fabrication methods, such as drawing, forming, stamping, or casting.

In accordance with one embodiment the present invention, and as exemplified in FIG. 1, end closure 22 is positioned within housing first end 16 and secured in the housing by one or more welds 23 formed along a seam between end closure 22 and housing wall 17, to provide a hermetic seal. Welding end closure 22 directly to the housing obviates the need for an O-ring or other seal between the housing and the end closure. In addition, as there is no need to machine or otherwise form a groove or cavity on any part to accommodate an O-ring or other compressive seal, the structure of the end closure and/or housing is simplified. In addition, the welded design obviates the need to provide an extra portion of housing material for a crimping operation; thus, the welded design is relatively compact.

In another embodiment (shown in FIG. 3), a portion of housing first end 16 is cold-worked or otherwise metal-formed to provide a hermetic metal-to-metal seal with a portion of end closure 22. In the embodiment shown in FIG. 3, an annular flange or protrusion 16a of housing first end 16 (shown as a dotted line in a pre-cold-worked state in FIG. 3, and also shown as compressed against a portion of end closure 22), is drawn through a die to cold-work and thereby compress the flange into a groove 22d formed along the end closure, once the end closure has been positioned. It will be appreciated that the volume of the annular flange or protruding portion 16a is at least approximately or substantially equal to the volume defined by the groove 22d. Other known metal-forming methods may also be employed. Using this method, the diameter of the gas generator may be effectively minimized by eliminating the need for a typical seal such as an O-ring at the end closure/housing interface, and also by compressing the annular flange 16d against end closure 22. Accordingly, a metal-to-metal contact is formed at the interface between end closure 22 and flange 16a once the substantially assembled gas generator is drawn and compressed through a die having a smaller diameter than the outer diameter of annular flange 16a prior to cold-working.

By cold-working the end of housing 12 to cold flow flange 16a against end closure 22, the housing 12 is compressed to provide sufficient retention strength of the end closure within the housing in accordance with customer specifications, while simplifying the manufacturing process by reducing surface treatment or assembly of additional parts such as an O-ring. Also, as shown in the embodiment of FIG. 3, compression of the housing end along the circumference of end closure 22 provides hermetic sealing of the inflator.

The cold-work technique of fitting and sealing the end closure 22 within the housing end 16 also results in the ability to substantially minimize the overall diameter of the inflator, while satisfying the structural and other design requirements relating to, for example, a shorting clip or ignition assembly, as determined by design requirements. One particular embodiment of the gas generator exhibits an outer diameter of approximately 41.3 millimeters, thereby decreasing the packaging size of the gas generator in comparison to previous designs, and also increasing the design flexibility with regard to a particular application (as a side inflator within a seat for example.)

Referring again to the embodiment of FIG. 1, an initiator assembly 24 is positioned and secured within end closure opening 22c. Initiator assembly 24 includes a bore seal 26 and an initiator 28 secured within a complementary cavity formed in the bore seal. Initiator 28 may be secured within bore seal 26 using any of a variety of methods, for example, by welding, crimping, an interference fit, or by adhesive application. A gasket or other seal (not shown) may be included for providing or enhancing a seal formed by the contact interface between initiator 28 and bore seal 26, to aid in preventing the escape of generated gases from the bore seal end of the gas generator.

Initiator assembly 24 is positioned and secured within end closure opening 22c so as to enable operative communication between ignition compound 34 (described below) and initiator 28, for igniting ignition compound 34 upon activation of the gas generating system. In the embodiments shown herein, initiator assembly 24 is secured in opening 22c by welding bore seal 26 directly to end closure 22, thereby obviating the need for an O-ring or other compressive seal between the bore seal and the end closure, or between the bore seal and the housing. This also enables the structures of the bore seal and end closure to be simplified. Bore seal 26 may be formed from steel or other metallic materials using any suitable method, such as casting or machining. Initiator 26 is a conventional initiator usable for igniting a gas generant or booster composition. One exemplary initiator construction is described in U.S. Pat. No. 6,009,809, incorporated herein by reference.

As bore seal 26 is separate from end closure 22 and need not perform the function of closing housing first end 16, only the bore seal (and not the entire end portion of the gas generator assembly) need be changeable to conform to customer requirements regarding the mating connector interface connectible to the electrical contacts of initiator 28. A portion of each version of the bore seal 26 is simply configured so as to be press-fittable into an opening in end closure 22 and weldable to end closure 22. This simplifies the structure of the bore seal while also adding design flexibility.

Referring again to FIG. 1, an ignition or booster cup 32 is nested within end closure 22. Ignition cup 32 has a base portion 32a and an annular wall 32b extending from the base portion to define a cavity for receiving therein an ignition or booster compound 34, an auto-ignition compound 35, and a portion of initiator assembly 24 (previously described). A flange 32c extends radially outwardly from an edge of wall 32b. An outer edge of flange 32c is dimensioned so as to engage end closure wall 22b in an interference fit when the ignition cup is inserted into the cavity formed by the end closure wall. Thus, booster compound 34 and auto-ignition compound 35 need only be positioned within booster cup 32 and flange 32c engaged with closure wall 22b to retain the booster and auto-ignition compounds within cup 32 during assembly of the gas generator. At least one ignition gas exit orifice 32d is formed in ignition cup 32 for release of ignition compound combustion products when ignition compound 34 is ignited. Orifice 32d may be covered with a rupturable, fluid-tight seal (not shown) as previously described. Ignition cup 32 may be stamped, extruded, die cast, or otherwise metal formed and may be made from a metallic material such as carbon steel or stainless steel.

In the embodiment shown in FIG. 1, ignition compound 34 is a known or suitable ignition or booster compound, whose combustion provides heat and pressure which ignites a second, main gas generant charge 38 (described below) positioned in housing 12. Also, as stated previously, one or more auto-ignition tablets 35 may be placed in ignition cup 32 to produce ignition of booster compound 34 (thereby resulting ignition of main gas generant 38) upon external heating of housing 12, in a manner well-known in the art. Referring again to FIG. 1, a washer-like pad or cushion 30 formed from, for example, a ceramic fiber material may be provided for holding the ignition material 34 in place and for cushioning the ignition material against vibration and impact.

Referring again to FIG. 1, one end of a filter assembly 52 is pressed into a cavity formed between booster cup wall 32b and end closure flange 22b. Filter assembly 52 is an annular arrangement of a filter material provided to filter combustion products from the generated gases prior to gas distribution. In general, filter assembly 36 is positioned between gas generant 38 and openings 18 formed along housing wall 17. In the embodiment shown in FIG. 1, filter assembly 52 substantially occupies an annular space between gas generant 38 and housing wall 17. Any suitable metallic mesh filter or woven wire cloth may be used, many examples of which are known and obtainable from commercially available sources (for example, Wayne Wire Cloth Products, Inc. of Bloomfield Hills, Mich.) The filter may alternatively be formed from any of a variety of materials (for example, a carbon fiber mesh, wire or sheet) known in the art for filtering gas generant combustion products.

In the embodiments shown herein, gas generant 38 is in the form of a plurality of wafers stacked in the interior of housing 12, within filter assembly 52. However, alternative forms of gas generant are also contemplated. For example, the gas generant tablets may be reduced in size, and then randomly arranged while filling the propellant chamber. Reduction of the size of the gas generant tablet increases the total combustion surface area. As a result, more gas is produced in a relatively shorter time. The gas generants that are employed may be characterized as "smokeless" or, stated another way, producing at least 90% or more gaseous combustion products when ignited.

Exemplary gas generant compositions are described in U.S. Pat. Nos. 5,872,329, 6,210,505, and 6,887,326, each incorporated herein by reference. These compositions may include primary non-metallic fuels, non-metallic primary oxidizers, secondary metallic oxidizers (if desired), and known binders. The compositions are formed in a known manner, and tableted to fit within the gas generator of the present invention. A preferred gas generant composition produces at least 95% or more gaseous combustion products during combustion thereof and may comprise phase-stabilized ammonium nitrate, for example, ammonium nitrate co-precipitated with potassium nitrate (PSAN), at about 65%-75% by weight of the gas generant composition, wherein potassium nitrate comprises 5%-15% of the AK/KN (ammonium nitrate/potassium nitrate) co-precipitation, mono-ammonium salt of bis-(1(2) H-tetrazol-5-yl)-amine at about 25%-34% by weight, fumed silica at about 0.25%-0.75% by weight, and graphite at about 0.05%-0.15% by weight, the weight percents being given relative to the total weight of the gas generant composition.

Referring again to FIG. 1, a second ignition or booster cup 44 is positioned at housing second end 14. Ignition cup 44 has a base portion 44a and an annular wall 44b extending from the base portion to define a cavity for receiving therein an ignition or booster composition 46. Ignition compound 46 may have the same or a different chemical composition or physical structure than ignition compound 34 previously described. A flange 44c extends radially outwardly from an edge of wall 44b. An outer edge of flange 44c is dimensioned so as to be slidably positionable within an inner diameter of housing wall 17 when the ignition cup is inserted into the housing. Also, one or more auto-ignition tablets 47 may be placed in ignition cup 44 to produce ignition of booster compound 46 (thereby resulting ignition of main gas generant 38) upon external heating of housing 12. Thus, booster compound 46 and auto-ignition compound 35 need only be positioned and secured within booster cup 44 (using, for example, a tape seal or other method) to retain the booster and auto-ignition compounds within cup 44 during assembly of the gas generator. At least one ignition gas exit orifice 44d is formed in ignition cup 44 for release of ignition compound combustion products when ignition composition 46 is ignited. Orifice 44d may be covered with a rupturable seal as previously described. Ignition cup 44 may be stamped, extruded, die cast, or otherwise metal formed and may be made from carbon steel or stainless steel, for example.

Referring to FIG. 1, a spring plate 40 is positioned at an opposite end of the gas generant stack from initiator 28. At least one orifice is formed in plate 40 to enable fluid communication between gas generant 38 on one side of plate 40 and combustion products formed by combustion of booster compound 46 in second booster cup 44. Spring plate 40 is adapted to be movable along the interior of housing 12 so as to abut gas generant 38 under the influence of a spring member 42 (described in greater detail below). Plate 40 is made from a metal or metal alloy and may be stamped or otherwise metal-formed.

As seen in FIG. 1, spring member 42 is positioned in housing 12 to abut both spring plate 40 and second booster cup 44. Spring member 42 is configured to have a spring constant that enables the spring to urge spring plate 40 along the interior of housing 12 to a certain degree, in response to the volume occupied by gas generant 38 within the housing. Spring member 42 exerts a biasing force on movable plate 40 acting in the direction indicated by arrow "A", thereby urging the gas generant against booster cup 32 at housing first end 16. This enables the quantity of gas generant 38 in the housing to be varied according to design requirements, while helping to isolate the gas generant from shock and vibration that may contribute to fracturing and rearrangement of any gas generant (such as gas generant 38) having a particular desired geometry or spatial arrangement. Spring member 42 may have any one of several configurations, such as a coil spring, a spiral spring, a leaf spring, or any other configuration suitable for providing the required biasing force while being enclosable within housing 12. Spring member 42 may be formed from a metal, metal alloy, or a polymer material.

Operation of the single-stage embodiment of the gas generator will now be discussed with reference to FIG. 1. Upon receipt of a signal from a crash sensor, an electrical activation signal is sent to igniter 28. Combustion products from the igniter expand into first ignition cup 32, igniting booster compound 34 positioned in booster cup 32. Products from the combustion of booster compound 34 proceed out of cup 32 through opening 32d to ignite gas generant composition 38. Combustion products such as hot gas, flame, and hot solids proceed through filter assembly 52 to exit the gas generating system housing through orifices 18 in housing wall 17.

FIG. 4 shows a dual-stage embodiment 100 of a gas generating system in accordance with the present invention. As seen in FIG. 4, dual-stage gas generator 100 includes the same basic components shown in the embodiment of FIG. 1. Thus, in FIG. 4, like numerals are used to identify features similar to those identified in FIG. 1. However, as the housing 112 is divided by a divider 160 into two independently-actuatable chambers to provide dual-stage capability, the number of components is essentially doubled. In addition, the groups of components are oriented such that each chamber (with regard to the physical arrangement of the components therein) is a "mirror-image" of the other chamber. However, the chambers may contain different quantities of gas generant, according to design requirements. Divider 160 may be secured within housing 112 at any desired point along the length of the housing using side-crimping or another suitable method. Divider 160 may be formed from a metal, ceramic, or other suitable material.

Operation of the dual-stage embodiment of the gas generating system will now be discussed with reference to FIG. 4. Operation of each chamber of the dual-stage embodiment is essentially the same as operation of the single-stage embodiment shown in FIG. 1. Upon receipt of a signal from a crash sensor, an electrical activation signal is sent to one (or both) of igniters 128 and 128'. Either of igniters 128 and 128' may be activated alone. Alternatively, both of igniters 128 and 128' may be activated separately, either in sequence or simultaneously. Combustion products from igniters 128 and 128' expand into ignition cups 132 and 132', igniting associated booster compounds 134 and 134' positioned in the cups. Products from the combustion of booster compounds 134 and 134' proceed out of their respective cups 132, 132' through openings 132d and 132d', igniting gas generants 138 and 138' positioned in housing 112. Generated gases then flow radially outward through filter assemblies 152, 152' and out of housing 112 through openings 118, 118'.

Figure 5:
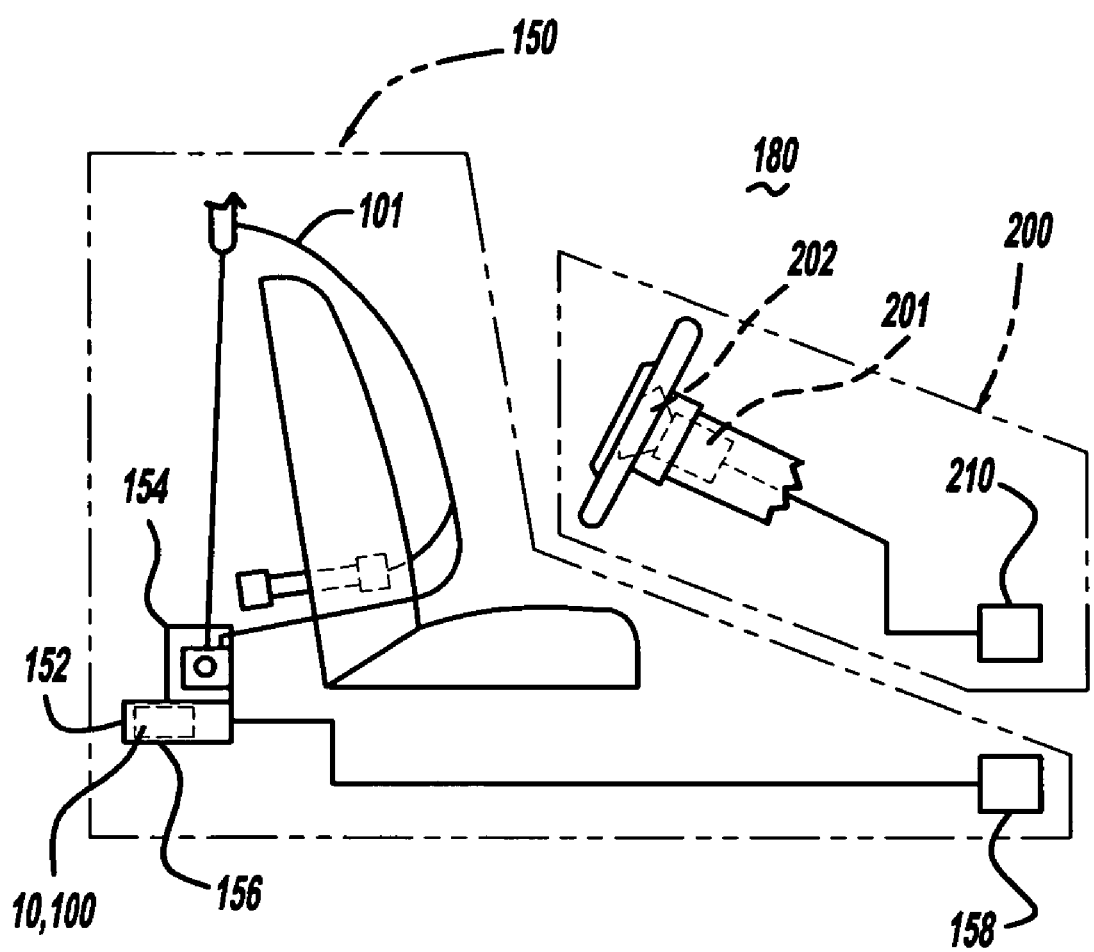
FIG. 5 is a schematic representation of an exemplary vehicle occupant protection system incorporating a gas generating system in accordance with the present invention.

Referring now to FIG. 5, an embodiment of the gas generating system 10 described above may also be-incorporated into any of a variety of vehicle occupant protection system elements. In one example, the 41.3 mm diameter version of the gas generating system previously described is incorporated into a safety belt assembly 150 for pretensioning the safety belt.

FIG. 5 shows a schematic diagram of one exemplary embodiment of an exemplary safety belt assembly 150. Safety belt assembly 150 includes a safety belt housing 152 and a safety belt 101 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558, 832 and 4,597,546, incorporated herein by reference. Illustrative examples of typical gas-actuated pretensioners with which the safety belt embodiments of the present invention may be combined are described in U.S. Pat. Nos. 6,505,790 and 6,419,177, incorporated herein by reference.

Safety belt assembly 150 may also include (or be in communication with) a crash event sensor 158 (for example, an inertia sensor or an accelerometer) operates in conjunction with a crash sensor algorithm that signals actuation of belt pretensioner 156 via, for example, activation of igniter 20a (not shown in FIG. 3) incorporated into the gas generating system. U.S. Pat. Nos. 6,505,790 and 6,419,177, previously incorporated herein by reference, provide illustrative examples of pretensioners actuated in such a manner.

Referring again to FIG. 5, safety belt assembly 150 may also be incorporated into a broader, more comprehensive vehicle occupant restraint system 180 including additional elements such as an airbag system 200. Airbag system 200 includes at least one airbag 202 and a gas generating system 201 coupled to airbag 202 so as to enable fluid communication with an interior of the airbag. Airbag system 200 may also include (or be in communication with) a crash event sensor 210. Crash event sensor 210 operates in conjunction with a known crash sensor algorithm that signals actuation of airbag system 200 via, for example, activation of airbag gas generating system 10 in the event of a collision.

It should be appreciated that safety belt assembly 150, airbag system 200, and more broadly, vehicle occupant protection system 180 exemplify but do not limit uses of gas generating systems contemplated in accordance with the present invention. In addition, it should be appreciated that a gas generating system incorporating a plurality of particulate aggregation surfaces and a high gas-yield, low solids-producing gas generant composition as described herein may be used in the airbag system or in other vehicle occupant protection system elements requiring a gas generating system for operation.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A gas generating system comprising:
 a housing;
 a first end closure secured to the housing for hermetically sealing a first end portion of the housing; and
 a first bore seal formed separately from the first end closure and secured to the first end closure for mounting a first gas generant combustion initiation mechanism therein,
 wherein the bore seal is insertable into an opening in the end closure after the end closure is secured to the housing,
 and wherein a portion of the end closure is slidably engaged with a portion of the housing to position the portion of the end closure within the housing prior to securement of the first end closure to the housing.

2. The gas generating system of claim 1 wherein the first end closure is secured to the housing by hot-forming at least one of the first end closure and the housing and shaping the at least one of the first end closure and the housing to sealingly engage a portion of the other one of the first end closure and the housing.

3. The gas generating system of claim 2 further comprising a second end closure secured to the housing for hermetically sealing a second end portion of the housing, and a second bore seal formed separately from the second end closure and secured to the second end closure for mounting a second gas generant combustion initiation mechanism therein, and wherein the second end closure is secured to the housing by hot-forming at least one of the second end closure and the housing and shaping the at least one of the second end closure and the housing to sealingly engage a portion of the other one of the second end closure and the housing.

4. The gas generating system of claim 1 wherein the first end closure is secured to the housing by welding.

5. The gas generating system of claim 4 further comprising a second end closure secured to the housing for hermetically sealing a second end portion of the housing, and a second bore seal formed separately from the second end closure and secured to the second end closure for mounting a second gas generant combustion initiation mechanism therein, and wherein the second end closure is secured to the housing by welding.

6. The gas generating system of claim 1 wherein the first end closure is secured to the housing by forcing a portion of the housing to cold-flow into a cavity formed by a portion of the first end closure to form a metal-to-metal seal between the housing and the end closure.

7. The gas generating system of claim 6 further comprising a second end closure secured to the housing for hermetically sealing a second end portion of the housing, and a second bore seal formed separately from the second end closure and secured to the second end closure for mounting a second gas generant combustion initiation mechanism therein, and wherein the second end closure is secured to the housing by forcing a portion of the housing to cold-flow into a cavity formed by a portion of the second end closure to form a metal-to-metal seal between the housing and the end closure.

8. The gas generating system of claim 1 wherein the first bore seal is welded to the first end closure to provide a hermetic seal therebetween.

9. The gas generating system of claim 1 further comprising:
   a second end closure secured to the housing for hermetically sealing a second end portion of the housing; and
   a second bore seal formed separately from the second end closure and secured to the second end closure for mounting a second gas generant combustion initiation mechanism therein,
   wherein the second bore seal is insertable into an opening in the second end closure after the second end closure is secured to the housing.

10. The gas generating system of claim 9 wherein an interior of the housing is divided into a first chamber and a second chamber, the first gas generant combustion initiation mechanism is positioned so as to initiate combustion of a first quantity of gas generant positioned within the first chamber upon activation of the first gas generant combustion initiation mechanism, and the second gas generant combustion initiation mechanism is positioned so as to initiate combustion of a second quantity of gas generant positioned within the second chamber upon activation of the second gas generant combustion initiation mechanism.

11. The gas generating system of claim 10 wherein the first quantity of gas generant has substantially the same composition as the second quantity of gas generant.

12. The gas generating system of claim 1 wherein the housing is deep-drawn to provide a closed end thereof.

13. The gas generating system of claim 1 wherein an end portion of the housing is hot-formed to close the end portion.

14. The gas generating system of claim 1 wherein the housing has an outer diameter of approximately 41.3 mm diameter.

15. A vehicle occupant protection system comprising a gas generating system in accordance with claim 1.

16. The vehicle occupant protection system of claim 15 wherein the gas generating system further includes a second end closure secured to the housing for hermetically sealing a second end portion of the housing, and a second bore seal formed separately from the second end closure and secured to the second end closure for mounting a second gas generant combustion initiation mechanism therein.

17. The gas generating system of claim 1 wherein the gas generating system is fittable longitudinally within a cylindrical size envelope having a diameter of approximately 41.3 mm.

18. The gas generating system of claim 1 wherein the gas generating system has an overall system diameter of approximately 41.3 mm.

19. The gas generating system of claim 1 further comprising a smokeless gas generant composition positioned in the interior of the gas generating system.

20. A gas generating system comprising:
   a housing;
   a first end closure secured to the housing for hermetically sealing a first end portion of the housing; and
   a bore seal inserted into an opening in the first end closure after the closure is secured to the housing,
   wherein the first end closure is secured to the housing by forcing a portion of the housing to cold-flow into a cavity formed by a portion of the first end closure to form a metal-to-metal seal between the housing and the end closure.

21. A gas generating system comprising:
   a housing; and
   a first end closure secured to the housing for hermetically sealing a first end portion of the housing;
   wherein the first end closure is secured to the housing by forcing a portion of the housing to cold-flow into a cavity formed by a portion of the first end closure to form a metal-to-metal seal between the housing and the end closure; and
   wherein a ratio of overall system length to overall system diameter is within a range from about 3.8/1 to about 5.3/1.

22. A vehicle occupant protection system comprising a gas generating system in accordance with claim 21.

* * * * *

UNITED STATES PATENT AND TRADEMARK OFFICE
CERTIFICATE OF CORRECTION

PATENT NO. : 7,802,812 B2  
APPLICATION NO. : 11/600622  
DATED : September 28, 2010  
INVENTOR(S) : Mayville et al.

Page 1 of 1

It is certified that error appears in the above-identified patent and that said Letters Patent is hereby corrected as shown below:

Column 2, Line 38, Delete "are"

Column 6, Line 22, Delete "44cis" and insert --44c is--

Column 7, Line 52, Delete "be-incorporated" and insert --be incorporated--

Column 10, Line 39, Claim 20, insert --end-- before closure

Signed and Sealed this
Twenty-eighth Day of December, 2010

David J. Kappos
*Director of the United States Patent and Trademark Office*